350-272

CROSS REFERENCE

SEARCH ROOM 178
7.6

X2680

Jan. 10, 1961 G. M. STAMPS 2,967,907

CONTINUOUS FACSIMILE SCANNING APPARATUS

Filed June 2, 1952 4 Sheets-Sheet 1

INVENTOR.
GEORGE M. STAMPS

BY J. B. Burke

ATTORNEY

Jan. 10, 1961 G. M. STAMPS 2,967,907

CONTINUOUS FACSIMILE SCANNING APPARATUS

Filed June 2, 1952 4 Sheets-Sheet 2

INVENTOR.
GEORGE M. STAMPS
BY J. B. Burke
ATTORNEY

Jan. 10, 1961 G. M. STAMPS 2,967,907

CONTINUOUS FACSIMILE SCANNING APPARATUS

Filed June 2, 1952 4 Sheets-Sheet 3

INVENTOR.
GEORGE M. STAMPS
BY J. B. Burke
ATTORNEY

Jan. 10, 1961 G. M. STAMPS 2,967,907

CONTINUOUS FACSIMILE SCANNING APPARATUS

Filed June 2, 1952 4 Sheets-Sheet 4

INVENTOR.
GEORGE M. STAMPS

BY J. B. Burke

ATTORNEY

United States Patent Office 2,967,907

Patented Jan. 10, 1961

2,967,907

CONTINUOUS FACSIMILE SCANNING APPARATUS

George M. Stamps, New Hyde Park, N.Y., assignor, by mesne assignments, to Hogan Faximile Corporation, a corporation of Delaware Filed June 2, 1952, Ser. No. 291,144

12 Claims. (Cl. 178—7.6)

The present invention relates to continuous facsimile apparatus and particularly to facsimile scanners.

In order to scan copy for facsimile transmission over wire lines or radio links, the signals representing the copy are usually generated by scanning the entire area of the copy, line-by-line, an elemental area at a time. A concentrated light beam is directed on or through the copy and the light transmitted from the elemental area is used to actuate a photoelectric cell (photocell) which in turn is connected to signal transmission apparatus.

In accordance with one aspect of the present invention two scanning elements, one a stationary flat film or plate having a straight linear slit or window and one a flat rotatable disk or plate having a slit or window in the form of an Archimedean spiral are used in association with each other in a facsimile apparatus. The elements are so disposed that the windows intersect to define a small quadrilateral scanning aperture. The rotatable disk is spaced a predetermined distance away from the scanned copy and an efficient optical system is disposed between the copy and one side of the disk. A photocell is disposed on the other side of the disk and spaced a predetermined distance from the disk with another optical system therebetween. Either or both optical systems may include suitably shaped reflectors located in the optical path between copy and photocell to lessen the overall distance between copy and photocell. The scanned copy is lighted along the scanning line by lamps extending the full width of the copy. To scan the copy, it is slowly moved past the illuminated scanning line and the light therefrom is transmitted to the rotating disk by the first mentioned optical system. A concentrated ray of light passes the intersection of the rotating and stationary windows and is focused on the photocell by the second optical system. Copy of any practical size from microfilm to copy several feet in width may be scanned by this system. The width of the copy to be scanned is not limited by the size of the rotatable disk or size of the photocell but is determined instead by the design of the optical system employed. The full width of the copy is evenly illuminated and the scanning beam is uniformly transmitted to the photocell. The copy may be scanned continuously by employing a suitable mechanism to coordinate movement of the copy and of the rotatable disk. In a modification of the invention, the copy is stationary and a portion of the optical system associated with the copy is moved in coordination with movement of the rotatable disk to provide slow scanning in one direction. The members having the spiral and straight windows are normally disposed closely adjacent to each other to provide the scanning aperture, but they may be spaced apart with a suitable optical system therebetween. The spiral and straight windows may either be slots formed in opaque elements or preferably are transparent windows in opaque films photographically formed in a novel manner on transparent bases. In the claims each of the various elements broadly referred to as an "opaque member" with a slit or slot or opening therein is to be construed to include a disk or member composed of opaque material, such as metal, with a spiral or linear slit or other opening formed therein to permit light to pass therethrough, and the phrase "opaque member" is also to be construed to include a disk or member comprising a base of transparent material having an opaque layer or surface portion in which is formed a spiral or linear slit or slot or opening to permit the passage of light. In the claims it is also understood that when the slits or slots are described as being "continuously transparent from end to end thereof," this includes the slits or slots of the types formed in the various elements broadly referred to as an "opaque member." Copy may be scanned, in accordance with the invention, at a definition of the order of 100 to 1000 lines per inch. In a modification of the invention a plurality of rotatable disks having spiral windows of different pitches is employed in a facsimile scanner. In another modification of the invention members having spiral and straight windows are employed in a facsimile recording apparatus. In a further modification of the invention the members having spiral and straight windows are used in a facsimile transceiver.

It is therefore an object of the present invention to provide novel facsimile scanning apparatus.

It is another object to provide facsimile apparatus embodying novel scanning members.

Other and further objects and advantages of the invention will become apparent from the detailed description of the invention given in connection with the various figures of the drawings.

Figures 1, 2, 3, 4, 5, 6, 7:
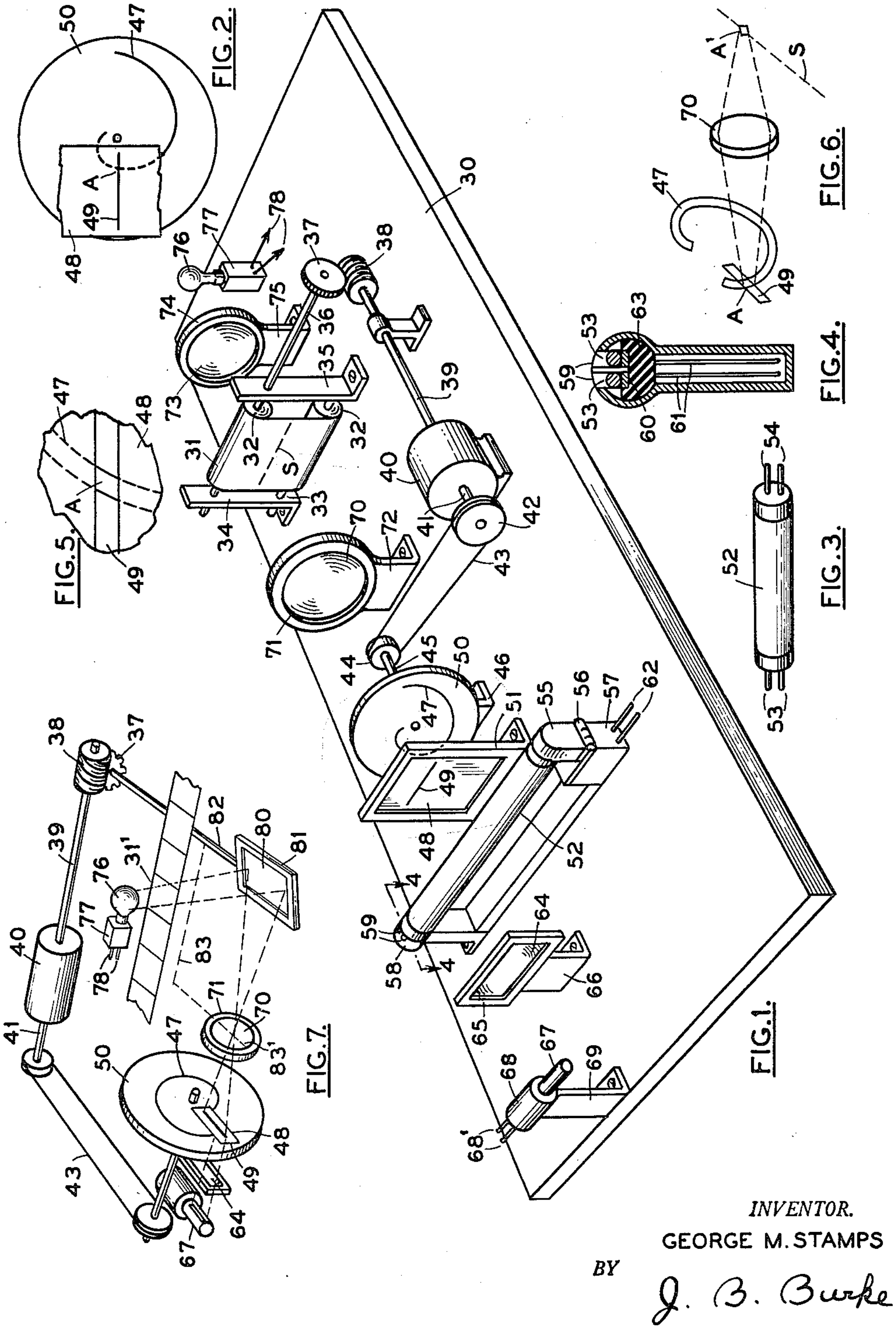
Fig. 1 is a perspective view of a facsimile transceiver in accordance with the invention.
Fig. 2 is an elevational view of scanning members forming part of the apparatus of Fig. 1.
Fig. 3 is a perspective view of a lamp forming part of Fig. 1.
Fig. 4 is a sectional view taken on lines 4—4 of Fig. 1.
Fig. 5 is a fragmentary view on an enlarged scale of the scanning members of Fig. 2.
Fig. 6 is a schematic showing of a portion of the optical system of Fig. 1.
Fig. 7 is a perspective view partially diagrammatic of a modification of Fig. 1 for scanning stationary copy.

In Fig. 1 is shown apparatus constituting a facsimile transceiver embodying the invention. A baseboard 30 is provided on which are mounted the various members making up the apparatus. Copy 31 which may be of any desired width is mounted on rollers 32. The lower roller 32 is attached to a shaft 33 which is supported at opposite ends in the mounting members 34, 35. The upper roller 32 is attached to a shaft 36 which passes through the mounting members 34, 35 and extends from member 35 at one end. To this end is affixed a worm gear 37. Worm gear 37 engages the worm 38 mounted at the end of the shaft 39 of motor 40. Motor 40 has a shaft extension 41 on which is mounted the pulley 42. A belt 43 extends around pulley 42 and a smaller pulley 44. Pulley 44 is mounted on shaft 45 to which is attached the disk 50. Disk 50 is rotatably mounted in mounting bracket 46 which is attached to the base 30. Disk 50 consists of a thin flat opaque member in which is a spiral window 47. Associated with the spiral window 47 is a thin flat opaque member 48 having a straight window 49. Members 48 and 50 are disposed parallel to each other with the windows intersecting as shown in Fig. 2. Member 48 is attached to frame 51. Lamp 52 is disposed adjacent to the member 48 and parallel to the window 49. Lamp 52 is an elongated cylindrical tube of conventional fluorescent type having pairs of contact pins 53, 54 extending from opposite ends as shown in Fig. 3. Pins 54 are housed in the lamp socket 55. The lower end of socket 55 is attached to a hinge 56 which in turn is mounted on a base 57. The pins 53 at the other end of the lamp 52 are disposed in socket 58 as shown best in Fig. 4 within two slots 59. Pins 53 are lodged in the slots 59 and contact the electrical contacts 60 from each of which extends a conductor 61. Power is supplied to the lamp from the conductors 62 which pass through the lamp base mounting member 57. Conductors 62 are electrically connected to appropriate terminals in sockets 55, 58. An insulation element 63 is provided in socket 58 to insulate contacts 60 from the sides of the socket 58. The lamp 52 is arranged so that it may be swung up and out of the way by means of the hinge 56, and when required may be lowered again with the pins 53 entering the slots 59 to engage the contacts 60. A lens 64 mounted in a frame 65 is supported on a bracket 66. The length of lens 64 is at least that of the window 49, but may be longer than the window. A photocell 67 mounted in a socket 68 is supported on a bracket 69. Between the rotatable member 50 and copy 31 is a lens 70 preferably a well corrected anastigmatic objective lens. Lens 70 is mounted in a frame 71 on the base 72. Another lens 73 is disposed on the other side of copy 21. Lens 73 is mounted in a frame 74 and supported on bracket 75. Beyond lens 73 is a projection-type lamp 76 supported on a socket housing 77 into which are led the conductors 78 from a suitable power source.

The shape of the elemental aperture or area formed by the intersection of windows 47 and 49 is of particular importance. As shown on an enlarged scale in Fig. 5 the area of intersection is a quadrilateral in the form of a parallelogram A. In conventional facsimile systems a recorder is commonly used having a helical electrode on a cylindrical drum in association with a linear electrode with a recording sheet therebetween. The area of contact of the electrodes which constitutes the recording area is substantially that of a parallelogram. It is desirable that a correspondingly shaped scanning aperture or area be employed at the scanning station of the system to insure fidelity of the recorded images at the recording station with the scanned copy. The arrangement of spiral window 47 and straight window 49 is such as to define this desired parallelogram at their area of intersection. When disk 50 rotates at a constant speed, the area A moves from end to end of window 49 at a constant rate. As shown in Fig. 6, the elemental area A is focused by lens 70 on an elemental scanned area A′ which lies on scanning line S of copy 31. Area A′ moves along scanning line S as the disk 50 rotates.

For operation of the apparatus of Fig. 1 as a scanning device, lamp 52 is lifted up out of socket 58 to establish an uninterrupted optical path from lamp 76 to photocell 67 via the scanning aperture A. The lamp 76 projects light through the lens 73 and the scanned line S of copy 31. The lens 70 focuses the image of this line on the plane of member 48. The scanning aperture A travels from one side to the other of the window 49 and is focused via lens 64 on to the photocell 67. Since lens 64 is stationary the image of scanned line S on photocell 67 is also stationary even though the intervening light rays pass through the constantly moving aperture A. A photosensitive element of the photocell receives the focused light signal and the signal is then transmitted over lines 68′ to a suitable facsimile transmitter. If automatic phasing (framing) of the scanned copy is desired, this may be accomplished by means of a commutator and brush (not shown) mounted on the shaft 45 of disk 50. If a line use ratio of the order of ⅞ is employed, a spiral 47 which extends only 315° on disk 50 is used. Reference level and pulse signals can then be sent during the ⅛ cycle when no scanning signal is being transmitted. The motor 40 is arranged to rotate disk 50 and move copy 31 simultaneously at a prdetermined speed ratio so that copy 31 continuously moves past scanning line S at the rate of one scanning line for each 360° rotation of disk 50. Thus if the scanning definition is fixed at 500 lines per inch, the copy 31 moves 1/500 of an inch for each rotation of disk 50. During the scanning operation copy 31 is held flat between the rollers 32, and disk 50 rotates in a plane parallel to the plane of the scanned copy. It may be found desirable to space the windows 47 and 49 apart with the window 47 adjacent to scanning line S. In this arrangement, the lens 70 should be designed and located to focus the slit-like light beam which results directly on the plane of window 47. The windows 47 and 49 appear in Fig. 1 as spaced apart to show the arrangement of window 47 on disk 50 more clearly. Actually the members 48 and 50 are located very close to each other so that windows 47 and 49 will be closely adjacent each other to obtain as sharply defined a scanning aperture A as possible. Where it is not possible to position windows 47 and 49 adjacent to each other, the members 48 and 50 may be spaced apart any convenient distance but a suitable lens system must be provided to insure focusing of the scanned area A′ on either the window 47 or window 49, whichever is closer to lens 64. In the claims when it is recited that an image of a transverse line of the copy medium is focused on, or substantially on, the linear slit, such language is to be construed to include constructions, such as in Fig. 1, wherein a spiral-slotted member may intervene between the linear slit and the focusing means, the image of the line still being "focused on," or substantially on, the linear slit broadly speaking.

For operation as a recorder, the aparatus is arranged as shown in Fig. 1. Modulated signals from a facsimile receiver receiving signals from a remote facsimile scanner are applied to lamp 52 which emits modulated light beams. The rotating spiral window 47 in association with straight window 49 cause a transmitted beam to sweep from end to end of the scanning line S on photosensitive film or paper 31. The film 31 is moved past the scanning line S at the same speed as scanning takes place at the remote facsimile scanner so that a facsimile message is recorded line-by-line. After exposure to the modulated light beam, film 31 is developed by conventional photographic methods.

In Fig. 7 is shown a modification of the invention wherein stationary copy 31' such as microfilm or the like is supported in any suitable manner in a stationary position. The projection lamp 76 directs light through the copy 31' to a mirror 80. The mirror 80 is supported in a frame 81 attached to a shaft 82 which in turn is connected to the worm gear 37. Worm gear 37, engages the worm 38 which is driven by the motor 40. The arrangement of windows 47, 49, lens 64 and photocell 67 is similar to that shown in Fig. 1, with the addition of mirror 80 which serves to make the arrangement somewhat more compact, so that the straight line distance between photocell 67 and copy 31' is materially less than the length of the optical path between the photocell and copy. When it is desired to scan the stationary copy, the mirror 80 is arranged to move in coordination with the disk 50 so that as the disk rotates a predetermined length of the copy 31' is scanned line-by-line. The scanning is done by projecting the image scanned to the mirror 80 which reflects the image to the lens 70. The lens 70 focuses the image on to the window 47. The lens 64 focuses the scanning aperture formed by the intersection of windows 47, 49 upon the photocell 67. If desired the mirror 80 may remain stationary and tilted at an angle to the optical axis of the lens 70, but the lens 70 may be movable. This movement may be accomplished by connecting the shaft 82 to lens frame 71 instead of to mirror frame 81. This connection is shown schematically by the dotted line 83. The lens 70 may then be moved laterally in the direction of diameter 83' or perpendicular thereto by means of a suitable cam arrangement. The scanning of the copy 31' line-by-line may then be done by tilting or moving the lens 70 in coordination with the motion of the disk 50.

Figures 8, 9, 10, 11, 12, 13, 14:
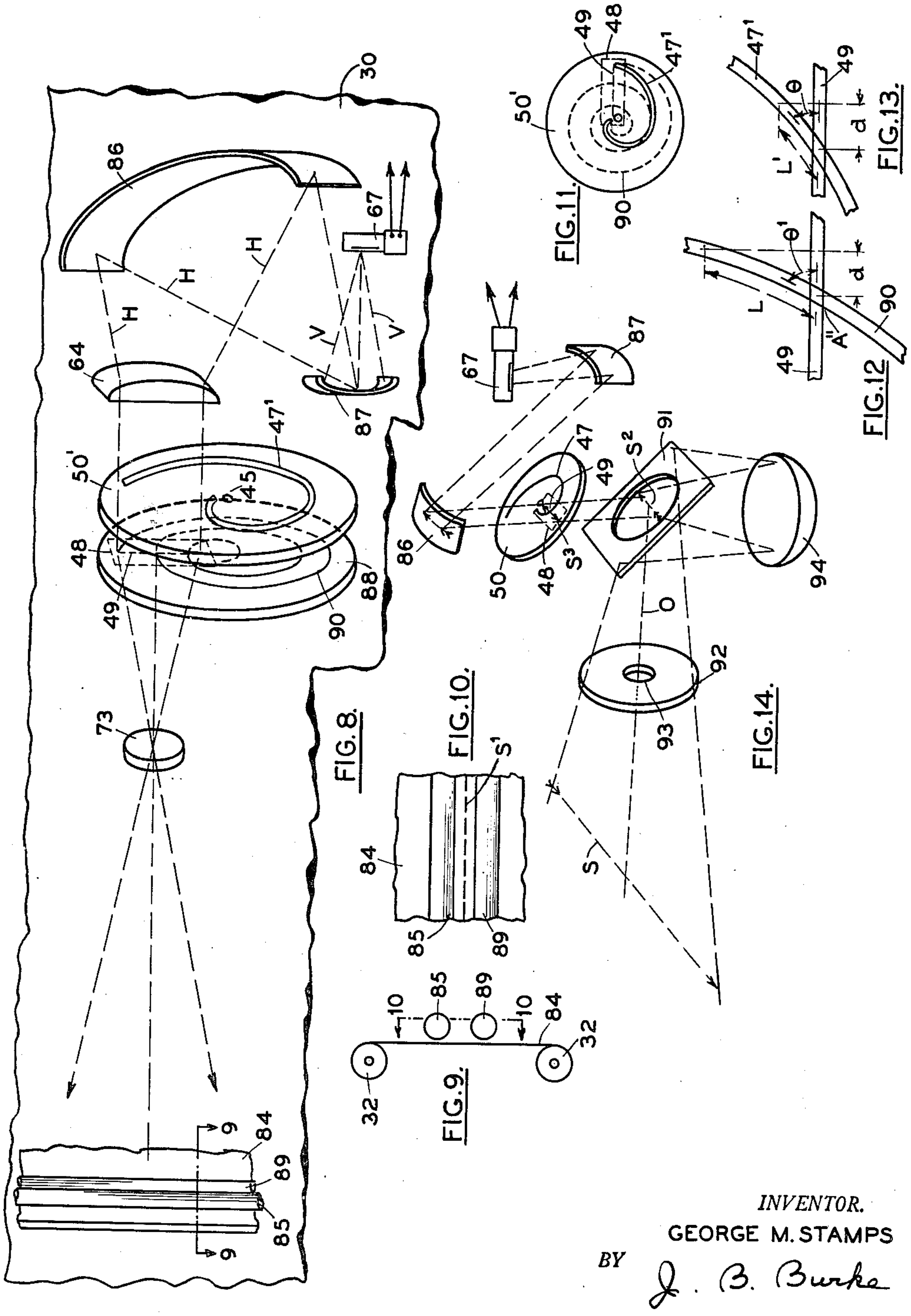
Fig. 8 is a plan perspective view partially diagrammatic of another modification of Fig. 1.
Fig. 9 is a sectional view taken on lines 9—9 of Fig. 8.
Fig. 10 is a sectional view taken on lines 10—10 of Fig. 9.
Fig. 11 is an elevational view of the scanning member assembly of Fig. 8.
Figs. 12 and 13 are diagrammatic views of portions of scanning windows used in explaining the operation of the scanning member assembly of Fig. 8.
Fig. 14 is a perspective view of another modification of the invention.

In Fig. 8 is shown a modification of the apparatus of Fig. 1 for scanning copy of extended width. The copy 84 may be of any desired width. Lamps 85, 89 replace lamp 76 supported by structure 30. The lamps 85, 89 as shown best in Figs. 9, 10 are disposed close to each other and adjacent the copy 84 but leaving space for a scanning line S. Lamps 85, 89 extend the full width of copy 84. The copy 84 is supported on suitable rollers 32 for movement past the scanning line S'. Two elliptical reflectors or mirrors 86 and 87 are used to reflect the image of the scanning line S from the lens 64 to the photocell 67. The elliptical reflectors are formed from flat sheets which are bent into elliptical shape and are tilted so that reflector 86 gathers horizontally diverging light as shown by the lines H, and directs these rays to the photocell 67 via the reflector 87. The reflector 87 is arranged to gather vertically divergent light as shown by the lines V. By use of these reflectors 86, 87 it is possible to form a very compact apparatus for scanning wide copy. In the apparatus of Fig. 8, two rotatable disks 50' and 88 are shown. Disk 88 has a spiral window 90 having a plurality of turns N. Disk 88 is disposed adjacent to the straight window 49 of member 48. The spiral window 90 intersects the linear window 49 at a plurality of points equal to the number of turns N of the spiral window as shown in Fig. 11 to define a plurality of quadrilateral apertures. When the disk 88 rotates, the intersection of the windows establishes N parallelogram apertures or areas which travel along window 49. When disk 88 rotates at constant speed, the apertures move along window 49 at a constant speed. Adjacent to disk 88 is disk 50' with a wide one turn spiral slot or window 47'. The disks 88 and 50' are arranged so that light may pass through only one of the quadrilateral apertures formed by windows 49 and 90 and through window 47'; thus disk 50' serves as an aperture selecting element. Disks 50' and 88 are arranged to be rotated by any suitable means with the speed of disk 88 equal to N times the speed of disk 50'. The velocity of spiral window 90 perpendicular to window 49 is N times as great for window 90 as for window 47'. As indicated in Figs. 12 and 13 for the same elemental sweep length $d$, the length L of window 90 which passes window 49 is N times greater than the length L' of window 47'. Thus irregularities which may exist in the width of spiral window 90 or other irregularities in the system are averaged over N times as great a length in producing the parallelogram aperture A''. In general irregularities in spiral width just detectable in an apparatus employing a one turn spiral window could be of the order of N times as prominent before being detectable when an N turn spiral window is used. Furthermore the N turn spiral window intersects window 49 at an angle $\theta'$ steeper than angle $\theta$. At positions close to the center of disk 50 in Fig. 2 the area of parallelogram A is increased due to the smaller intersection angle of the spiral and straight windows. For whatever limit is placed on the maximum area of the scanning aperture, the N turn spiral window produces its limiting area of parallelogram A'' closer to the center of disk 88 than the one turn spiral window 47 of Fig. 2 of corresponding sweep distance. Thus a disk with N turn spiral window may have a smaller radius than a disk with a one turn spiral window which sweeps the same distance across window 49. If desired the disks 50' and 88 may be carried by the same shaft 45 with one disk riding on a sleeve bearing on shaft 45. A suitable gear train from a driving motor may then be arranged to drive disk 88 at N times the speed of disk 50'. Of course many other mechanical arrangements are possible as will readily occur to those skilled in the art. It should be noted that spiral window 47' must have a width at least as great as the maximum width of spiral window 90 to avoid obscuring the aperture A at any point along the window 49. Although spiral 47' appears to intersect the second turn of spiral 90 in Fig. 11 no light will pass through this point of intersection. The only light which will reach photocell 67 is that which passes windows 49, 90 and 47'. If necessary opaque member 48 may be made large enough to cover all of disk 88.

In Fig. 14 is shown an arrangement of apparatus for scanning copy employing a modified Schmidt optical system. By using this type of optical system a very compact arrangement of the apparatus for scanning purposes is obtained. A plane mirror 91 is tilted at an angle of 45° to the optic axis O of a corrector lens 92. At the center of lens 92 is an aperture 93. The image of the scanned line S is transmitted through the corrector lens 92 to the plane of the mirror 91. From mirror 91 the image is reflected through a hole in mirror 91 to the hemispherical mirror 94. From mirror 94 the image is reflected to the scanning disk 50 as shown by the arrow $S^3$. The arrow $S^2$ represents the image of scanned line S at the hole in mirror 91; disk 50 and associated member 48 scans the line $S^3$ in the usual manner and the image of scanned line is projected upon the elliptical reflector or mirror 86 as in Fig. 8. From the elliptical reflector 86 the image is reflected in turn to the elliptical reflector 87 and then to the photocell 67. The bending of the optical path as shown in Fig. 14 accomplishes a considerable reduction of the overall dimensions needed for a wide copy scanner.

The structure and formation of the spiral and straight windows of the various scanning members presents special problems. Under certain conditions metal plates with machined slots may be used. But when definition in scanning of the order 100 to 1000 lines per inch is required, very narrow windows of the order of .01 to .001 of an inch in width must be used. The width of each window should not vary by more than 10% throughout its length to avoid introducing distortion into the transmitted facsimile signal and subsequently recorded copy.

It has been found extremely difficult to machine a satisfactory straight or spiral slot less than one hundredth of an inch in width in a flat disk or plate. Also when a fine line is scratched or cut through a painted or otherwise opaquely coated surface of a transparent disk, the sides of the slot are found too rough, and jagged and the width of the slot is too non-uniform for use in a high definition facsimile system. Scanning elements having slots less than one hundredth of an inch have been found to have the further disadvantage that they collect and hold dust and debris which impairs their proper functioning in facsimile apparatus. It is of particular importance that the spiral window be an accurately formed continuous Archimedean spiral. This type of curve has the unique characteristic that the locus of its intersection with a straight line moves at a constant speed along the line when the spiral is rotated at a constant speed.

Figures 15, 16, 17, 27, 28:
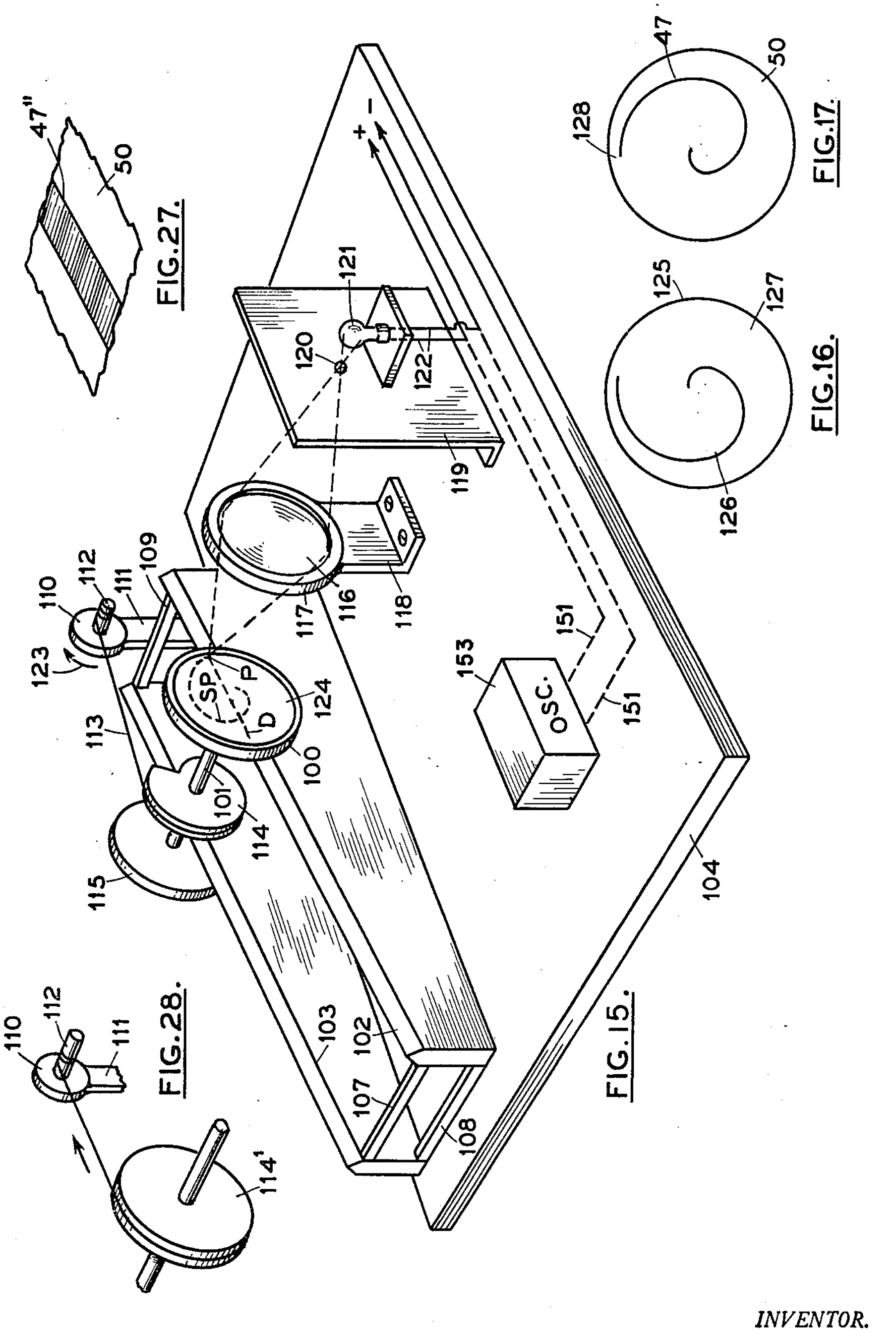
Fig. 15 is a perspective view of apparatus employed in making a member having spiral window.
Fig. 16 is an elevational view of a photographic negative made with the apparatus of Fig. 15.
Fig. 17 is an elevational view of a scanning member formed from the negative of Fig. 16.
Fig. 27 is a fragmentary perspective view on an enlarged scale of a modified form of scanning window.
Fig. 28 is a perspective view of a modification of a portion of the apparatus of Fig. 15.

The apparatus shown in Fig. 15 may be used in a preferred method for obtaining a spiral window which meets the critical requirements of high definition facsimile systems. A plate 100 is mounted perpendicular to a shaft 101 which can roll on inclined rails 102, 103. The tops of the rails may have knife edges or may be slightly rounded. The rails are mounted on a base 104 and are joined for rigidity by bars 107, 108, 109. A constant speed clock motor 110 is mounted on a post 111 attached to base 104. Motor 110 has a shaft 112 around which is wound a flexible line 113. Line 113 is attached to a spiral cam 114. A counterweight plate or disk 115 may be attached to the end of shaft 101 to balance plate 100. A lens 116 is held in a mounting ring 117 on a base 118 attached to baseboard 104. A plate 119 is mounted parallel to plate 100 and has an aperture 120. Lamp 121 is provided with power over lines 122 and emits a beam of light passing through aperture 120 which is focused as a spot P on plate 100. The several members are disposed so that spot P is disposed on a diameter D of plate 100 parallel to the rail edges 102, 103. The line 113 is held taut by the weight of the plate-shaft members 100, 101, 114, 115. As shaft 112 rotates in direction shown by arrow 123, spot of light P traces a spiral SP on the face of the plate 100. A circular photographic plate or film 124 is mounted on plate 100. Since cam 114 is spiral and line 113 always remains substantially tangent thereto, the point of tangency of the line and cam moves at a constant rate when shaft 112 rotates at a constant rate. Each point on the spiral path SP is consequently exposed to the point of light P the same length of time. The photographic plate 124 when developed is a negative 125 having a black spiral line 126 on a transparent base 127 as shown in Fig. 16. A contact print is then made of negative 125 by conventional photographic methods resulting in a plate 50 having a transparent spiral window 47 in opaque background 128 as indicated in Fig. 17.

Figures 18, 19, 20, 21, 22, 23, 24, 25, 26:
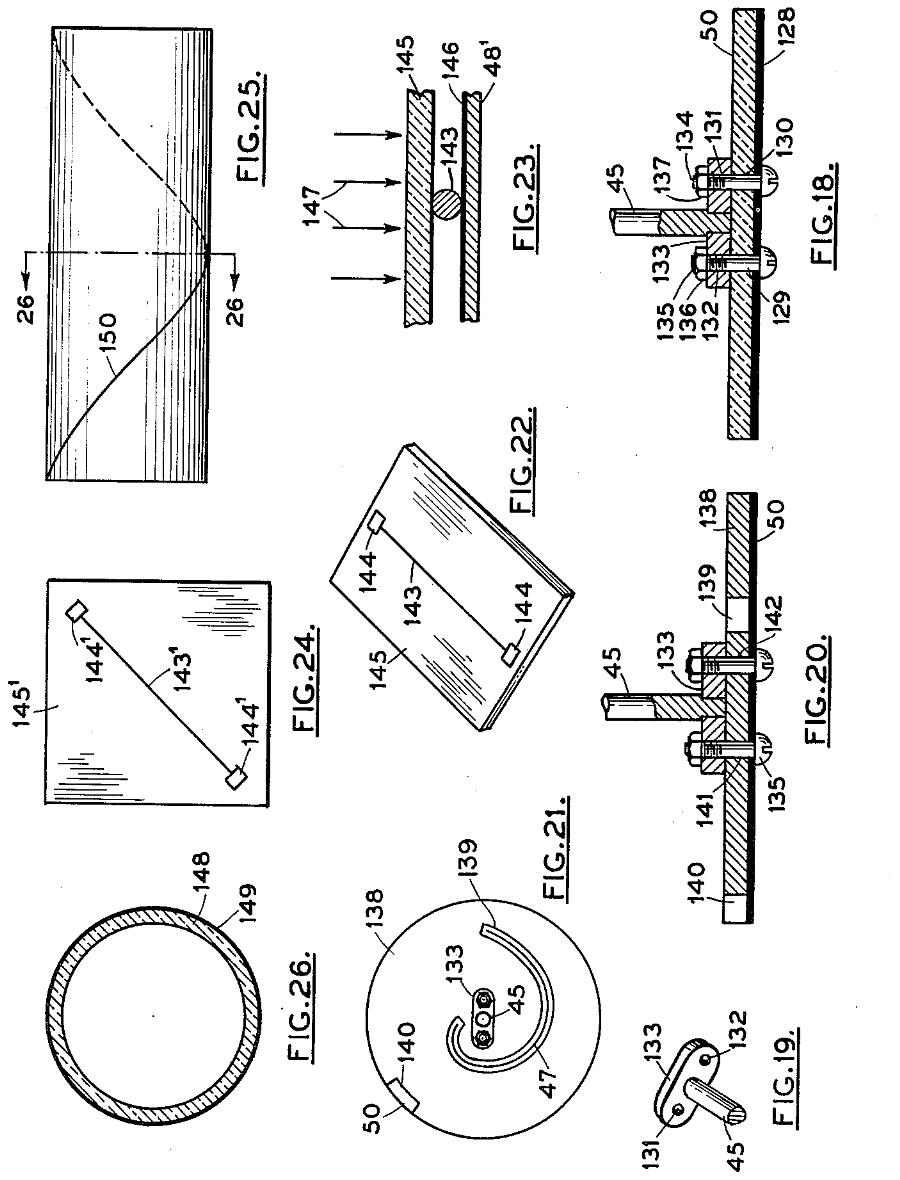
Fig. 18 is a sectional view of a scanning member assembly.
Fig. 19 is a perspective view of a shaft-mounting plate assembly forming part of Fig. 18.
Fig. 20 is a sectional view of another form of scanning member assembly.
Fig. 21 is a plan view of the assembly of Fig. 20.
Fig. 22 is a perspective view showing one step in a method of forming a scanning member having a straight window.
Fig. 23 is a sectional view of another step in the method of forming a scanning member having a straight window.
Fig. 24 is an elevational view of a step in a method of forming a member having a helical window.
Fig. 25 is an elevational view of a cylindrical drum with scanning member having a helical window mounted thereon.
Fig. 26 is a sectional view taken on lines 26—26 of Fig. 25.

Plate 50 may be mounted as shown in Fig. 18. Two holes 129, 130 are drilled in plate 50 to match holes 131, 132 in a plate 133. Attached to plate 133 is a shaft 45; see Fig. 19. Bolts 134, 135 and nuts 136, 137 attach the plate-shaft assembly to plate 50.

An alternate form of mounting for plate 50 is shown in Figs. 20, 21. Plate 50 is in the form of a thin opaque film having spiral window 47. Plate 50 is attached to a rigid plate 138 of metal or other suitable material. A wide spiral cutout 139 is provided in plate 138 over which window 47 in plate 50 is centered. Cutout 140 in plate 138 is provided to balance the plate for rotation. Bracket plate 133 with shaft 45 is attached to plate 138 by suitable bolts and nuts. Bolts 134, 135 pass through holes 141, 142 in plate 138.

The member 48 with its straight window 49 may be formed as shown in Figs. 22, 23. A wire 143 of any desired width may be laid in a straight line by stretching and then fastening at its ends by pieces of adhesive tape 144 to a transparent plate 145. The plate 145 is then turned over on a photographic plate or film 48' having an emulsion layer 146. Direct parallel rays of light are directed downward as shown by arrows 147 on to emulsion layer 146 past wire 143. On development of plate 48' by suitable photographic methods the member 48 with straight window 49, shown in Fig. 1, will be obtained.

In certain facsimile scanners a rotatable cylindrical drum with helical window is used. The method illustrated in Figs. 22 and 23 may be adapted for producing a helical window. As shown in Fig. 24 a wire 143' is disposed in a diagonal straight line on rectangular plate 145' and is held by pieces of adhesive tape 144'. A photographic negative is then made by the contact method shown in Fig. 23. The resulting negative 149 has a straight window 150 and when negative 149 is wound on and attached to transparent cylinder 148 as shown in Fig. 26, the straight window 150 assumes a helical form as shown in Fig. 25. If desired, the cylinder 148 may be formed with a helical slot and negative 149 may be attached to the cylinder with window 150 centered between the sides of the slot.

The apparatus of Fig. 15 may be used to form the spiral windows 47' and 90 of Fig. 8 as well as window 47 of Figs. 1, 7, and 14. The spiral window 47' may if desired be a wide slot in a metallic disk since its width is not critical. The apparatus of Fig. 15 is also adapted to produce a modified form of spiral window as shown in Fig. 27. A sinusoidal oscillator 153 of conventional structure may be connected by leads 151 across the conductors 122 supplying power to lamp 121. The variable voltage output of oscillator 153 will cause sinusoidal modulation of the light emitted by the lamp. The resulting window 47'', a portion of which is shown schematically in Fig. 27 on an enlarged scale will be found to include the modulations since it will vary in transparency sinusoidally along its length. A scanning element having this type of window has utility in a facsimile scanning system to scan copy and simultaneously generate a carrier for the scanned signal. If copy is scanned with this scanning element the light signal cast on a photocell of a facsimile transmitter will be modulated at the same frequency as the frequency of oscillator 153. Thus the scanning element acts to generate its own signal carrier in the transmitter. In normal operation of a scanning member as shown in Fig. 1, the member 50 is rotated at a uniform angular rate. Each element of length of the spiral window 47 passes straight window 49 at a decreasing rate when the spiral travels from the outside toward the center past the aperture. In order to insure uniform modulation of the light transmitted through the aperture the variations in transparency of the window 47'' must necessarily decrease in spacing uniformly from the outermost end of the spiral to the innermost end. This varied spacing may be accomplished by uniformly increasing the frequency of the sinusoidal voltage generated by oscillator 153 as the plate-shaft system rolls up the rails 102, 103. As an alternative to varying the frequency of the voltage generated by oscillator 153, the apparatus of Fig. 15 may be modified as shown in Fig. 28. Spiral cam 114 is replaced by a circular disk 114'. With this modification, the frequency of the voltage output of oscillator 153 may be held constant as the plate-shaft system rolls up the rails. The film or plate 124 should have a wide latitude of permissible exposure so that the film will be properly exposed from beginning to end of the tracing of spiral SP.

In this specification, the term "copy" denotes a record medium in the form of a sheet or strip of paper, photographic film or other suitable material of extended length and capable of bearing a graphic record.

Although several embodiments of the present invention have been shown and described herein many other modifications will be apparent to those skilled in the art without departing from the invention. The invention is therefore to be limited only by the scope of the appended claims.

What is claimed is:

1. A continuous scanning facsimile apparatus, comprising a rotatable flat opaque member having therein a fine continuous spiral slit of not less than substantially one turn disposed in an optical path, means for rotating said member at a substantially constant speed, a stationary opaque member having a fine linear slit therein disposed in said path to intersect optically said spiral slit and to define therewith at least one quadrilateral scanning aperture, said aperture being repeatedly movable along the linear slit during rotation of the spiral slit, each of the slits having a substantially uniform width, not greater than .01 of an inch throughout its length, each of the slits being continuously transparent from end to end thereof, means for supporting and continuously advancing a graphic copy sheet longitudinally in said optical path in one direction simultaneous with rotation of said spiral slit, said direction being substantially perpendicular to said linear slit, a stationary lens disposed between said stationary member and said last-named means and adapted to focus substantially on said linear slit an image of a single transverse line of said copy sheet so that only said image is repeatedly scanned by said scanning aperture during rotation of the spiral slit, a light source disposed at one end of the optical path and arranged to flood illuminate the copy sheet, a member disposed at the other end of the optical path and arranged to receive light transmitted from said copy sheet through said moving scanning aperture for conversion into electrical pulses, and optical means disposed in said optical path and adapted to focus on said last-named member light from said linear slit the continuous advancement of said copy sheet causing images of successive transverse lines of the copy sheet to be scanned by the transversely moving scanning aperture.

2. A continuous scanning facsimile apparatus, comprising a rotatable flat opaque member having therein a fine continuous multiturn spiral slit disposed in an optical path, means for rotating said member at a substantially constant speed, a stationary opaque member having a fine linear slit therein disposed in said path to intersect optically said spiral slit and to define therewith a plurality of quadrilateral scanning apertures, said apertures being repeatedly movable along the linear slit during rotation of the spiral slit, each of the slits having a substantially uniform width, not greater than .01 of an inch throughout its length, each of the slits being continuously transparent from end to end thereof, another rotatable opaque member having an opening therein, means for rotating said other opaque member at a speed equal to $1/N$ times the speed of rotation of the flat opaque member, where N is the number of turns of the spiral slit, the opening in said other member being so shaped and disposed that only one of said scanning apertures is exposed in said optical path through said opening during rotation of the rotatable member, means for supporting and continuously advancing a graphic copy sheet longitudinally in said optical path in one direction simultaneous with rotation of said spiral slit, said direction being substantially perpendicular to said linear slit, a stationary lens disposed between said stationary member and said last-mentioned means and arranged to focus on the linear slit a line set transversely across said copy sheet so that only said image is repeatedly scanned by said one scanning aperture during rotation of the spiral slit, a light source disposed at one end of the optical path and arranged to flood illuminate the copy sheet, a member disposed at the other end of the optical path and arranged to receive light transmitted from said copy sheet through said one scanning aperture, and a lens disposed in said optical path and arranged to focus said linear slit on the last named member the continuous advancement of said copy sheet causing images of successive transverse lines of the copy sheet to be scanned by said one scanning aperture moving along said linear slit.

3. A facsimile apparatus comprising a rotatable flat opaque member having a spiral slit disposed in an optical path, means for rotating said member, a stationary opaque member having a linear slit disposed in said path with the linear slit intersecting optically the spiral slit to define therewith at least one scanning aperture, said aperture being repeatedly movable along the linear slit during rotation of the spiral, each of the slits being continuously transparent from end to end thereof, means for supporting and continuously advancing a graphic copy medium in said optical path in one direction simultaneously with rotation of said spiral slit, said direction being substantially perpendicular to said linear slit, a stationary lens arranged to focus substantially on the linear slit an image of a line set transversely across said copy medium so that only said image is repeatedly scanned by said scanning aperture during rotation of the spiral slit, and a light source disposed at one end of the optical path and arranged to direct light on the copy medium, the continuous advancement of said copy medium causing images of successive transverse lines of the copy medium to be scanned by the transversely moving scanning aperture.

4. A continuous scanning facsimile apparatus, comprising a rotatable flat opaque member having therein a fine continuous substantially Archimedean spiral slit of not less than substantially one turn disposed in an optical path, means for rotating said member at a susbtantially constant speed, a stationary opaque member having a fine linear slit therein disposed in said path to intersect optically said spiral slit and to define therewith at least one quadrilateral scanning aperture, said aperture being repeatedly movable along the linear slit during rotation of the spiral slit, each of the slits having a substantially uniform width, not greater than .01 of an inch throughout its length, each of the slits being continuously transparent from end to end thereof, means for supporting and continuously advancing a graphic copy sheet longitudinally in said optical path in one direction simultaneous with rotation of said spiral slit, said direction being substantially perpendicular to said linear slit, a stationary lens system disposed between said stationary member and said last-mentioned means and adapted to focus substantially onto the linear slit an image of a line set transversely across said copy sheet so that only said image is repeatedly scanned by said scanning aperture during rotation of the spiral slit, a light source disposed at one end of the optical path and arranged to flood illuminate the copy sheet, the continuous advancement of said copy sheet causing images of successive transverse lines of the copy sheet to be scanned by the transversely moving scanning aperture, a photoelectric cell disposed at the other end of said optical path, and another lens system arranged to concentrate light from the linear slit on said photoelectric cell so that light transmitted from said copy sheet through said moving scanning aperture is converted to electrical pulses.

5. A continuously scanning facsimile apparatus, comprising a rotatable flat opaque member having therein a multiturn spiral slit disposed in an optical path, means for rotating said member, a stationary opaque member having a linear slit disposed in said path with the linear slit intersecting optically the spiral slit to define therewith a plurality of scanning apertures, said apertures being repeatedly movable along the linear slit during rotation of the spiral slit, each of the slits being continuously transparent from end to end thereof, another rotatable opaque member having an opening therein, means for rotating said other opaque member at a speed equal to $1/N$ times the speed of rotation of the flat opaque member, where N is the number of turns of the spiral slit, the opening in said other member being so shaped and disposed that only one of said scanning apertures is exposed in said optical path through said opening during rotation of the rotatable members, means for supporting and continuously advancing a graphic copy sheet in said optical path in one direction simultaneously with rotation of said spiral slit, said direction being substantially perpendicular to said linear slit, a stationary lens arranged to focus substantially on the linear slit an image of a line set transversely across said copy sheet so that only said image is repeatedly scanned by said scanning aperture during rotation of the spiral slit, and a light source disposed at one end of the optical path and arranged to flood illuminate the copy sheet, the continuous advancement of said copy sheet causing images of successive transverse lines of the copy sheet to be scanned by the transversely moving scanning aperture.

6. A continuous scanning facsimile apparatus, comprising a rotatable flat opaque member having therein a fine continuous multiturn substantially Archimedean spiral slit disposed in an optical path, means for rotating said member at a substantially constant speed, a stationary opaque member having a fine linear slit therein disposed in said path to intersect optically said spiral slit and to define therewith a plurality of quadrilateral scanning apertures, said apertures being repeatedly movable along the linear slit during rotation of the spiral slit each of the slits having a susbtantially uniform width, not greater than .01 of an inch throughout its length, each of the slits being continuously transparent from end to end thereof, another rotatable opaque member having a single turn spiral slot therein, means for rotating said other opaque member at a speed equal to $1/N$ times the speed of rotation of the flat opaque member, where N is the number of turns of the spiral slit, said other member being disposed so that only one of said scanning apertures is exposed in said optical path through said slot during rotation of the rotatable members, means for supporting and continuously advancing a graphic copy sheet longitudinally in said optical path in one direction simultaneous with rotation of the rotatable opaque members, said direction being substantially perpendicular to said linear slit, a stationary lens disposed between said stationary opaque member and said last-mentioned means and arranged to focus substantially on the linear slit an image of a line set transversely across said copy sheet so that only said image sheet is repeatedly scanned by said one scanning aperture during rotation of the spiral slit, a light source disposed at one end of the optical path and arranged to flood illuminate the copy sheet, a photoelectric cell disposed at the other end of the optical path and arranged to receive light transmitted from said copy sheet through said one scanning aperture, and a lens system disposed in said optical path and arranged to focus an image of said linear slit on the photoelectric cell, the continuous advancement of said copy sheet causing images of successive transverse lines of the copy sheet to be scanned one line at a time by said one scanning aperture moving along said linear slit.

7. A facsimile scanning apparatus, comprising a rotatable flat opaque member having therein a fine continuous multiturn spiral slit disposed in an optical path, means for rotating said member at a substantially constant speed, a stationary opaque member having a fine linear slit therein disposed in said path to intersect optically said spiral slit and to define therewith a plurality of scanning apertures, said apertures being repeatedly movable along the linear slit during rotation of the spiral slit, each of the slits having a substantially equal width, each of the slits being continuously transparent from end to end thereof, another rotatable opaque member having an opening therein disposed in said optical path, and means for rotating said other opaque member at a speed equal to $1/N$ times the speed of rotation of the flat opaque member, where N is the number of turns of the spiral slit, the opening in said other member being so shaped and disposed that only one of said scanning apertures is continuously exposed in said optical path through said opening during rotation of the rotatable members.

8. An apparatus according to claim 7, wherein said other opaque member is a flat disk and said opening is a one turn spiral slot.

9. A continuously scanning facsimile apparatus, comprising a rotatable flat opaque member having a spiral slit disposed in an optical path, means for rotating said member, a stationary opaque member having a linear slit disposed in said path with the linear slit intersecting optically the spiral slit to define therewith a scanning aperture, said aperture being repeatedly movable along the linear slit during rotation of the spiral slit, each of the slits being continuously transparent from end to end thereof, means for supporting and continuously advancing a graphic copy sheet in said optical path in one direction simultaneously with rotation of said spiral slit, said direction being substantially perpendicular to said linear slit, stationary optical means adapted to focus substantially on the linear slit an image of a line set transversely across said copy sheet so that only said image is repeatedly scanned by said scanning aperture during rotation of the spiral slit, said optical means including a lens having a central aperture, a plane mirror having a central aperture, and a hemispherical mirror disposed in said optical path, light source means disposed at one end of the optical path and adapted to flood illuminate the copy sheet, and a photoelectric cell disposed at the other end of the optical path to receive light transmitted from said copy sheet through said moving scanning aperture, the continuous advancement of said copy sheet causing images of successive transverse lines of the copy sheet to be scanned by the transversely moving scanning aperture.

10. A continuously scanning facsimile apparatus, comprising a rotatable flat opaque member having a spiral slit disposed in an optical path, means for rotating said member, a stationary opaque member having a linear slit disposed in said path with the linear slit intersecting optically the spiral slit to define therewith a scanning aperture, said aperture being repeatedly movable along the linear slit during rotation of the spiral slit, each of the slits being continuously transparent from end to end thereof, means for supporting and continuously advancing a sheet in said optical path in one direction simultaneously with rotation of said spiral slit, said direction being substantially perpendicular to said linear slit, stationary lens means for focusing substantially on to the linear slit an image of a line set transversely across said sheet so that only said image is repeatedly scanned by said scanning aperture during rotation of the spiral slit, light source means disposed at one end of the optical path and adapted to flood illuminate the sheet, a photosensitive device disposed at the other end of the optical path to receive light transmitted from said sheet through said moving scanning aperture, the continuous advancement of said sheet causing images of successive transverse lines of the sheet to be scanned by the transversely moving scanning aperture, and second light source means disposed near said other end of the optical path for transmitting a moving beam of modulated light through said scanning aperture to said sheet, said first and second light source means being selectively operable alternatively to transmit light respectively therefrom.

11. A facsimile apparatus comprising a rotatable flat opaque member having a spiral slit disposed in an optical path, means for rotating said member, a stationary opaque member having a linear slit disposed in said path with the linear slit intersecting optically the spiral slit to define therewith a scanning aperture, said aperture being repeatedly movable along the linear slit during rotation of the spiral slit, each of the slits being continuously transparent from end to end thereof, means for supporting and continuously advancing a sheet in said optical path in one direction simultaneously with rotation of said spiral slit, said direction being substantially perpendicular to said linear slit, a stationary lens for focusing substantially on to the linear slit an image of a line set transversely across said sheet so that only said image is repeatedly scanned by said scanning aperture during rotation of the spiral slit, and modulated light source means disposed at one end of the optical path for directing modulated light on to said sheet to scan successive transverse lines on said sheet by the transversely moving scanning aperture.

12. A facsimile scanner for graphic copy, comprising a frame, means disposed on a part of the frame for moving said copy continuously in one direction, an elongated lamp carried by the frame and disposed to illuminate a line of said copy extending transversely to said direction, a phototube disposed on another part of the frame, said lamp and phototube being located at opposite ends of an optical path, a plurality of scanning elements disposed in said optical path, said elements comprising a disk having a fine, continuous spiral scanning window and a member having a straight window intersecting the spiral window, said straight window extending substantially perpendicular to said one direction, said disk being rotatable in coordination with movement of said copy.

References Cited in the file of this patent

UNITED STATES PATENTS

| | | |
|---|---|---|
| 1,128,979 | Hess | Feb. 16, 1915 |
| 1,546,784 | Hottman | July 21, 1925 |
| 1,777,556 | Fahrney | Oct. 7, 1930 |
| 1,851,748 | Berlin | Mar. 29, 1932 |
| 1,921,835 | Owens | Aug. 8, 1933 |
| 1,939,161 | Bestelmeyer | Dec. 12, 1933 |
| 1,954,962 | Tate | Apr. 17, 1934 |
| 1,963,079 | Duke | June 19, 1934 |
| 2,010,764 | Hogan | Aug. 6, 1934 |
| 2,037,764 | Daneker | Apr. 21, 1936 |
| 2,064,475 | Ives | Dec. 15, 1936 |
| 2,143,011 | Juhasz | Jan. 10, 1939 |
| 2,178,933 | Davis | Nov. 7, 1939 |
| 2,371,963 | Pierre | Mar. 20, 1945 |
| 2,415,702 | Morrison | Feb. 11, 1947 |
| 2,463,280 | Kaehni et al. | Mar. 1, 1949 |
| 2,510,200 | Thompson | June 6, 1950 |
| 2,589,421 | Morrison | Mar. 18, 1952 |

FOREIGN PATENTS

| | | |
|---|---|---|
| 236,978 | Great Britain | July 17, 1925 |
| 465,184 | Great Britain | May 3, 1937 |
| 814,060 | France | June 14, 1937 |
| 472,160 | Great Britain | Sept. 17, 1937 |
| 481,792 | Great Britain | Mar. 11, 1938 |
| 488,253 | Great Britain | July 1, 1938 |
| 488,419 | Great Britain | July 5, 1938 |